2 Sheets—Sheet 1.
B. F. ADAMS,
Assignor to THE PLUME & ATWOOD MANUFACTURING CO.
Lamp-Burner.
No. 8,661. Reissued April 8, 1879.
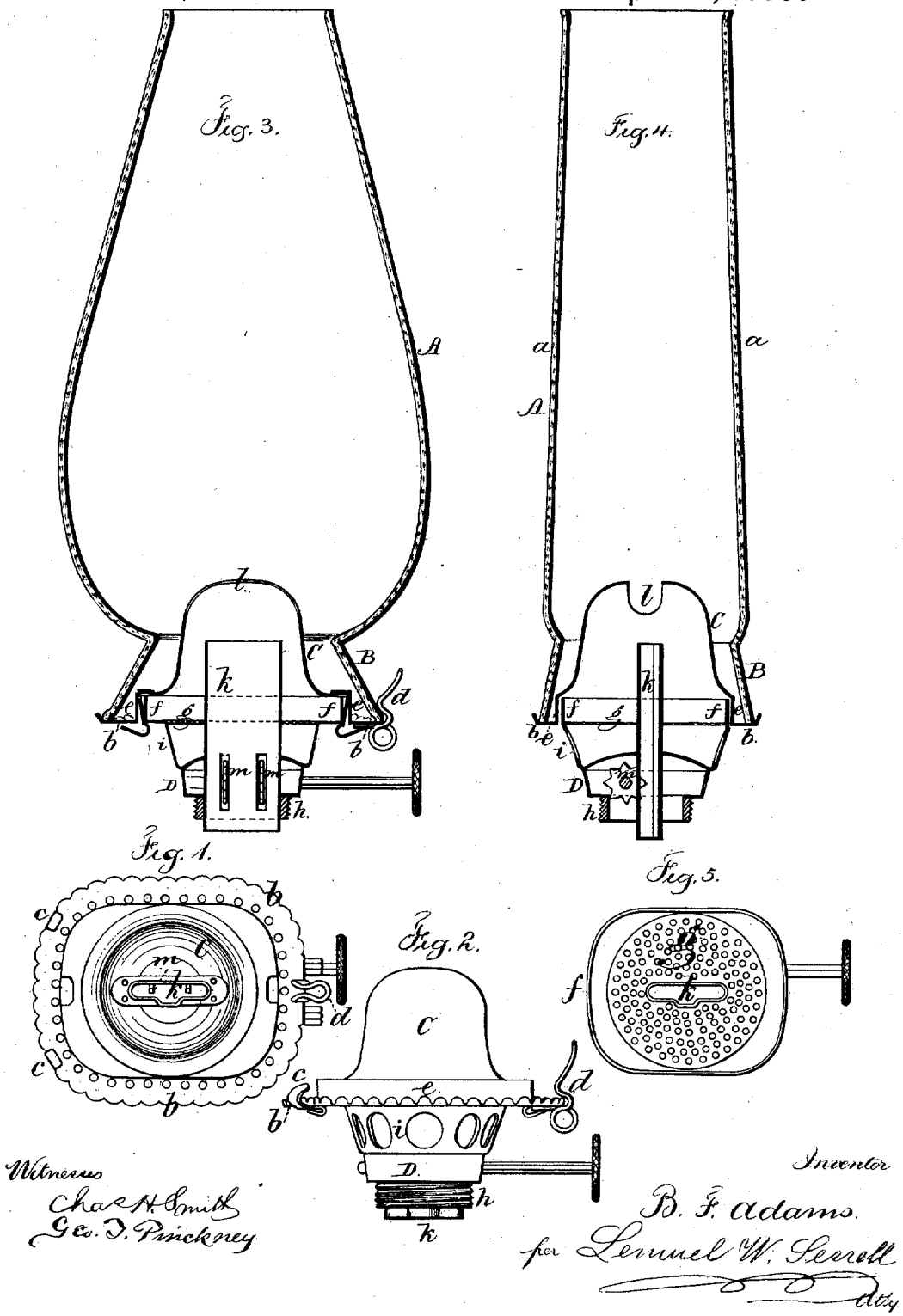
N. PETERS, PHOTO-LITHOGRAPHER, WASHINGTON, D. C.

2 Sheets—Sheet 2.

B. F. ADAMS,

Assignor to THE PLUME & ATWOOD MANUFACTURING CO.

Lamp-Burner.

No. 8,661. Reissued April 8, 1879.

Witnesses

Chas. H. Smith

Geo. T. Pinckney

Inventor

B. F. Adams.

per Lemuel W. Serrell

Atty

N. PETERS, PHOTO-LITHOGRAPHER, WASHINGTON, D. C.

UNITED STATES PATENT OFFICE.

BENJAMIN F. ADAMS, OF BOSTON, MASSACHUSETTS, ASSIGNOR TO THE PLUME & ATWOOD MANUFACTURING COMPANY, (FORMERLY KNOWN AS THE HOLMES, BOOTH & ATWOOD MANUFACTURING COMPANY,) OF WATERBURY, CONNECTICUT.

IMPROVEMENT IN LAMP-BURNERS.

Specification forming part of Letters Patent No. 106,302, dated August 16, 1870; Reissue No. 8,661, dated April 8, 1879; application filed October 25, 1878.

*To all whom it may concern:*

Be it known that I, BENJAMIN FRANKLIN ADAMS, of Boston, in the State of Massachusetts, have invented an Improvement in Lamp-Burners, of which the following is a specification.

Lamp-burners have been made in an elliptical form to receive an elliptical chimney, and chimneys have also been made with bulbs flattened in the direction in which the flame is spread.

In my lamp I make use of a cone the base of which is longer in one direction than the other, or flattened, so as to correspond to the chimney, the base of which is of a similar shape, and I arrange this chimney, chimney-holder, and cone, or deflector, so that the same is removable from the base of the burner for trimming or lighting.

Figure 6:
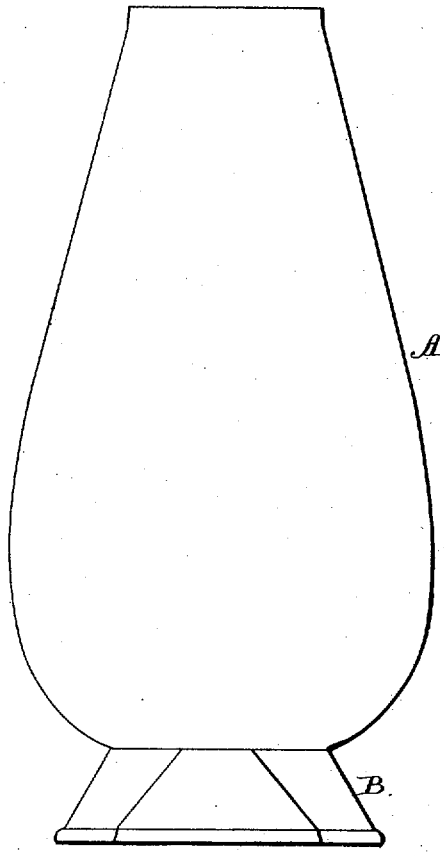
Figure 7:
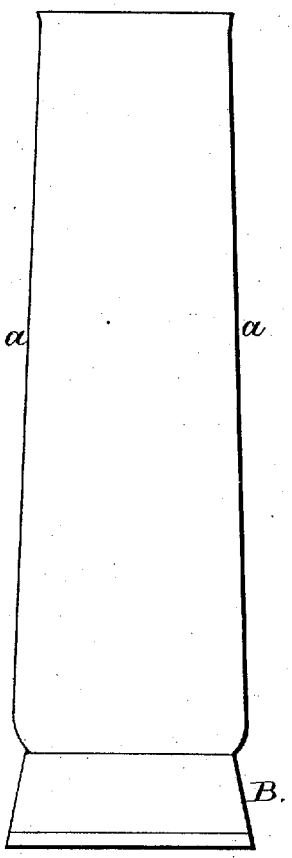
Figure 8:
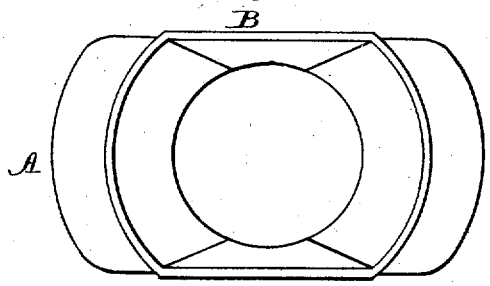

In the drawings, Figure 1 is a plan of the burner. Fig. 2 is a side view of the same. Fig. 3 is a vertical section of the burner and chimney through its longest diameter. Fig. 4 is a similar view through its shortest diameter. Fig. 5 is a plan of the base of the burner. Figs. 6 and 7 represent the chimney in elevation, and Fig. 8 is an inverted plan of the base of the chimney.

The base D of the burner contains the flat wick-tube *k*, wick-raiser *m*, screw *h*, for attaching the burner to the reservoir, and an exterior shell, *i*, with openings for the passage of the air to the flame. This shell *i* terminates in a rim, *f*, that receives the movable portion of the burner. The foraminous air-distributer is shown at *g*. The same divides the atmosphere passing to the burner into small streams.

The reflector or cone *c* is provided with a flame-slot, *l*, as usual, but its base is longer in one direction than the other.

The chimney-holder *b*, that surrounds the cone or deflector, is of the same general shape as the base of such cone or deflector—that is to say, it is longer in one direction than the other. It is represented with nearly straight sides and rounding ends, and the base B of the chimney is of the same configuration as the chimney-holder. The hooks *c c* and spring-latch *d* are shown for securing the chimney upon the chimney-holder.

The chimney-holder and deflector are removable from the burner, the oblong rim *f* fitting a similarly-shaped socket, *e*, at the base of the cone or deflector. This allows the chimney and deflector to be removed for lighting or trimming the lamp.

The chimney is in the general form of a flattened bulb, A, the opposite sides *a a* being parallel, or nearly so. The base portion B is conical to fit the chimney-holder, and I remark that the longest diameter of the chimney is in the direction in which the flame spreads from the flat wick.

The row of perforations at the base of the deflector adjacent to the chimney-holder admits air to pass up between the deflector and chimney, to steady the flame and prevent smoke upon the chimney.

The removable portion of the burner being united to the base by a connection that is longer in one direction than the other allows for removal, and insures the proper position of the parts when replaced.

I am aware that in gas-burners a chimney and ring have been used without a deflector, such parts being flattened at the sides, as in Letters Patent No. 49,010, and in Letters Patent No. 86,867 there is an elliptic deflector for a similarly-shaped chimney; but such deflector is in the form of a plate that is located up in the chimney, such chimney being suspended by hooks from the edge of the deflector.

I therefore do not claim any of the separate parts employed by me; but by the combination of devices the lamp is rendered superior to others that had before been made, because the chimney with the flattened sides is supported around the base of the deflector upon a holder that is of the same shape, and the metal parts of the burner extend from the chimney-holder to the base D of the burner.

I claim as my invention—

1. In a lamp-burner, a cone or deflector the base of which is longer in one direction than the other, in combination with a similarly-shaped chimney-holder directly at the base of the deflector and a flat wick-tube, substantially as specified.

2. The combination, in a lamp-burner, of a chimney-holder that is longer in one direction than the other, a cone or deflector that rises upwardly directly from the chimney-holder, and a foraminous air-distributer, substantially as set forth.

3. In a lamp in which the cone or deflector and chimney-holder are removable from the base of the burner, a cone having a base that is longer in one direction than the other, and a similarly-shaped chimney-holder directly at the base of the cone or deflector, substantially as specified.

4. In combination with a cone or deflector the base of which is longer in one direction than the other, a similarly-shaped chimney-holder, a flat wick-tube, a wick-raiser, and a foraminous air-distributer, substantially as specified.

Signed by me this 15th day of October, A. D. 1878.

B. F. ADAMS.

Witnesses:
M. W. LANDERS,
W. B. ROGERS.